United States Patent
Jiang et al.

(10) Patent No.: US 10,575,209 B2
(45) Date of Patent: *Feb. 25, 2020

(54) METHOD AND DEVICE FOR DATA SHUNTING

(71) Applicant: Huawei Technologies Co., Ltd., Shenzhen (CN)

(72) Inventors: Yi Jiang, Shenzhen (CN); Wei Quan, Beijing (CN); Weiwei Song, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/234,898

(22) Filed: Dec. 28, 2018

(65) Prior Publication Data

US 2019/0141565 A1 May 9, 2019

Related U.S. Application Data (63) Continuation of application No. 14/517,483, filed on Oct. 17, 2014, now Pat. No. 10,206,139, which is a (Continued)

(30) Foreign Application Priority Data

Apr. 19, 2012 (CN) .......................... 2012 1 0118243

(51) Int. Cl.
    *H04W 72/04* (2009.01)
    *H04W 28/02* (2009.01)
    (Continued)

(52) U.S. Cl.
    CPC ....... *H04W 28/0289* (2013.01); *H04L 47/785* (2013.01); *H04L 47/805* (2013.01);
    (Continued)

(58) Field of Classification Search
    CPC . H04W 72/0413; H04W 72/04; H04W 28/18; H04W 28/06
    See application file for complete search history.

(56) References Cited

U.S. PATENT DOCUMENTS

| | | |
|---|---|---|
| 2005/0210154 A1 | 9/2005 | Verma et al. |
| 2008/0049695 A1 | 2/2008 | Ogura |

(Continued)

FOREIGN PATENT DOCUMENTS

| | | |
|---|---|---|
| CN | 1859300 A | 11/2006 |
| CN | 101079680 A | 11/2007 |

(Continued)

OTHER PUBLICATIONS

3GPP TS 36.300 V11.1.0 (Mar. 2012), 3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 194 pages (Mar. 2012).

(Continued)

*Primary Examiner* — Lakeram Jangbahadur
(74) *Attorney, Agent, or Firm* — Leydig, Voit & Mayer, Ltd.

(57) ABSTRACT

A method and device for data shunting and related to the technical field of communications are provided. The present invention solves the problem that the requirements for the Service Quality cannot be satisfied, because the shunted data can't be transmitted in the shunting network based on appointed Service Quality; and the reliability of data transmission and the system resource utilization are decreased. The method concretely comprises the following steps: the first network device of the first network determines the second Quality of Service parameter of the second network according to the first Quality of Service parameter of data to be transmitted in the first network; the first network device (Continued)

transmits some or all of data to be transmitted to the second network device of the second network according to the second Quality of Service parameter. The method can be applied to data shunting.

19 Claims, 10 Drawing Sheets

Related U.S. Application Data continuation of application No. PCT/CN2013/074427, filed on Apr. 19, 2013.

(51) Int. Cl.
  *H04W 28/08*  (2009.01)
  *H04L 12/915*  (2013.01)
  *H04L 12/927*  (2013.01)
  *H04W 92/20*  (2009.01)
  *H04W 76/12*  (2018.01)
  *H04W 28/24*  (2009.01)

(52) U.S. Cl.
  CPC ....... *H04W 28/0268* (2013.01); *H04W 28/08* (2013.01); *H04W 76/12* (2018.02); *H04W 92/20* (2013.01); *H04W 28/24* (2013.01)

(56) References Cited

U.S. PATENT DOCUMENTS

| | | | |
|---|---|---|---|
| 2008/0076441 A1 | 3/2008 | Zhou | |
| 2009/0103491 A1 | 4/2009 | Zuniga et al. | |
| 2010/0240370 A1 | 9/2010 | Pandit et al. | |
| 2011/0320588 A1* | 12/2011 | Raleigh | H04W 36/245 709/224 |
| 2012/0039304 A1* | 2/2012 | Kim | H04W 28/08 370/332 |
| 2012/0254464 A1 | 10/2012 | Armstrong et al. | |
| 2012/0307736 A1 | 12/2012 | Tang et al. | |
| 2013/0028237 A1 | 1/2013 | Cheng et al. | |
| 2013/0157659 A1 | 6/2013 | Ikeda et al. | |
| 2014/0079007 A1 | 3/2014 | Li et al. | |

FOREIGN PATENT DOCUMENTS

| | | | |
|---|---|---|---|
| CN | 101299714 A | 11/2008 | |
| CN | 102215530 A | 10/2011 | |
| CN | 102244899 A | 11/2011 | |
| CN | 102422673 A | 4/2012 | |
| JP | 2007281754 A | 10/2007 | |
| JP | 2010045812 A | 2/2010 | |
| JP | 2010529815 A | 8/2010 | |
| JP | 2011139528 A | 7/2011 | |
| JP | 2011166251 A | 8/2011 | |
| JP | 2012503437 A | 2/2012 | |
| JP | 2012524424 A | 10/2012 | |
| JP | 2013526087 A | 6/2013 | |
| JP | 2015511102 A | 4/2015 | |
| WO | 2009147643 A2 | 12/2009 | |
| WO | WO-2009147643 A2 * | 12/2009 | ......... H04L 12/5692 |
| WO | 2010033631 A1 | 3/2010 | |
| WO | 2010119707 A1 | 10/2010 | |
| WO | 2011140898 A1 | 11/2011 | |
| WO | 2012032782 A1 | 3/2012 | |
| WO | 2012037666 A1 | 3/2012 | |
| WO | 2013142361 A1 | 9/2013 | |

OTHER PUBLICATIONS

3GPP TS 36.331 V10.5.0 (Mar. 2012), 3rd Generation Partnership Project;Technical Specification Group Radio Access Network; Evolved Universal Terrestrial Radio Access (E-UTRA); Radio Resource Control (RRC); Protocol specification (Release 10), 302 pages (Mar. 2012).

3GPP TS 36.413 V10.5.0 (Mar. 2012), 3rd Generation Partnership Project;Technical Specification Group Radio Access Network; Evolved Universal Terrestrial Radio Access Network (E-UTRAN); S1 Application Protocol (S1AP) (Release 10), 255 pages (Mar. 2012).

* cited by examiner

METHOD AND DEVICE FOR DATA SHUNTING

CROSS-REFERENCE TO RELATED APPLICATIONS

This application is a continuation of U.S. patent application Ser. No. 14/517,483, filed on Oct. 17, 2014, which is a continuation of International Patent Application No. PCT/CN2013/074427, filed Apr. 19, 2013, which claims priority to Chinese Patent Application No. 201210118243.6, filed Apr. 19, 2012. All of the afore-mentioned patent applications are hereby incorporated by reference in their entireties.

TECHNICAL FIELD

Embodiments of the present disclosure relate to the technical field of communication, and in particular to a method and an apparatus for shunting data.

BACKGROUND

With the growth of mobile Internet services, data of wireless communication network increase sharply, thereby boosting the demand for broadband. In order to alleviate the congestion of mobile cellular network, part of the data from the mobile cellular network may be shunt with other available access technology as a complement to the mobile cellular network.

Conventionally, the main complementary network technology for data shunting may include: Wireless Fidelity (WiFi), femtocell, Integrated Mobile Broadcast (iMB), etc., in Wireless Local Area Networks (WLANs). These technologies may be applied to Long Term Evolution network (LTE), Universal Mobile Telecommunication System (UMTS) and other cellular networks.

In LTE and UMTS cellular networks, when a user equipment (UE) transmits data, a base station for the user equipment may configure a corresponding Radio Bearer (RB) for the data needing to be transmitted according to a specified quality of service (QoS) required by the data, where different RBs may be provided with different wireless parameters to ensure the specified quality of service for the carried data. The user equipment adopts the RB configured by the base station to transmit the data, and hence the data transmission may be reliable and the resources may be utilized effectively.

In realizing the data shunting as described above, the inventors found that: if a shunting network is adopted by the system to shunt data, the shunted data may not be transmitted in the shunting network based on the specified quality of service due to a lack of a corresponding mechanism, i.e., the specified quality of service in the shunting network may not be guaranteed, hence the shunting network may fail to meet the requirement of the specified quality of service, and the data transmission may be less reliable.

SUMMARY

It is to provide a method and an apparatus for shunting data, which may solve the following problem: the shunted data may not be transmitted in the shunting network based on the specified quality of service, hence the shunting network may fail to meet the requirement of the specified quality of service, and the data transmission may be less reliable.

In view of this, the following technical solutions are provided according to the embodiments of the disclosure.

A method for shunting data is provided, including:
determining, by a first network device in a first network, a second quality of service parameter in a second network according to a first quality of service parameter in the first network for data needing to be transmitted; and
transmitting, by the first network device, part or all of the data to a second network device in the second network according to the second quality of service parameter.

Furthermore, another method for shunting data is provided, including:
receiving, by a second network device in a second network, part or all of the data needing to be transmitted, where the part or all of the data is transmitted by a first network device in a first network according to a second quality of service parameter, the second quality of service parameter is determined for the second network by the first network device according to a first quality of service parameter in the first network for the data needing to be transmitted.

An apparatus for shunting data is provided, including:
a determining unit, configured to be used by a first network device in a first network to determine a second quality of service parameter in a second network according to a first quality of service parameter in the first network for the data needing to be transmitted;
a transmitting unit, configured to be used by the first network device to transmit part or all of the data to a second network device in the second network according to the second quality of service parameter.

Furthermore, another apparatus for shunting data is provided, including:
a first receiving unit, configured to be used by a second network device in a second network to receive par or all of the data needing to be transmitted, where the part or all of the data is transmitted by a first network device in a first network according to a second quality of service parameter, the second quality of service parameter is determined for the second network by the first network device according to a first quality of service parameter in the first network for the data needing to be transmitted.

According to the method and apparatus for shunting data provided according to the embodiment of the disclosure, before the data is shunted, the first network device determines the second quality of service parameter in the second network according to the first quality of service parameter in the first network for the data needing to be transmitted; after the data is shunted, the first network device transmits part or all of the data to the second network device according to the second quality of service parameter. After a process of shunting data, since the second QoS parameter is determined according to the first QoS parameter, it may be guaranteed that for the data transmission in the second network the QoS parameter required by the data needing to be transmitted may be met and the reliability of data transmission may be improved.

BRIEF DESCRIPTION OF THE DRAWINGS

To make the embodiments provided by the disclosure better understood by those skilled in the art, the drawings used in the disclosure will be briefly described in the following. Obviously, the drawings described in the following are only a few of the embodiments of the disclosure, and those skilled in the art may obtain other drawings according to these drawings without creatively work.

DETAILED DESCRIPTION

The technical solutions according to the embodiments of the disclosure will be specified in conjunction with the drawings. Obviously, the disclosed embodiments are a few of the embodiments of the disclosure, rather than all of the embodiments. Other embodiments obtained by those skilled in the art without creative work based on the embodiments of the disclosure, fall into the scope of the disclosure.

The technical solution provided in the disclosure may be applicable in a variety of mobile cellular networks, such as Wideband Code Division Multiple Access (WCDMA) network or Long Term Evolution (LTE) network.

A base station includes, but not limited to, NodeB in WCDMA network or Evolutional Node B (eNB) in LTE network, etc.

A shunting access device includes, but not limited to, Wireless Fidelity Access Point (WIFI AP) in WLAN, Home NodeB (HNB) in home network, or Home Evolved NodeB (HeNB), etc.

Figure 1:
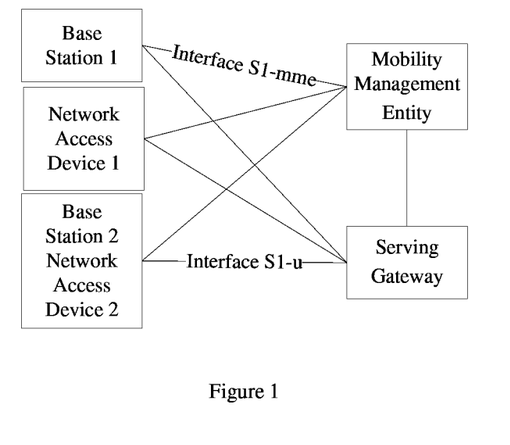
FIG. 1 is a network architecture in which a method for shunting data provided according to an embodiment of the disclosure may be applied.

A method for shunting data is provided according to this embodiment, where the method is applicable in the network architecture shown in FIG. 1.

As shown in FIG. 1, the Mobility Management Entity (MME), the Serving Gateway (S-GW), etc., may be network elements of Evolved Packet Core (EPC) of Long Term Evolution (LTE) network defined in the existing 3rd Generation Partnership Project (3GPP) protocol system. The network element in the LTE wireless access network may include a base station, where the base station may be connected to the MME via a control plane interface S1-mme, or be connected to the S-GW via a user plane interface S1-u. The base station and the network access device may belong to a same physical entity, or belong to two separate physical entities, respectively.

As shown in FIG. 1, base station 1 and network access device 1 belong to two separate physical entities, respectively; base station 2 and network access device 2 belong to one physical entity.

Figure 2:
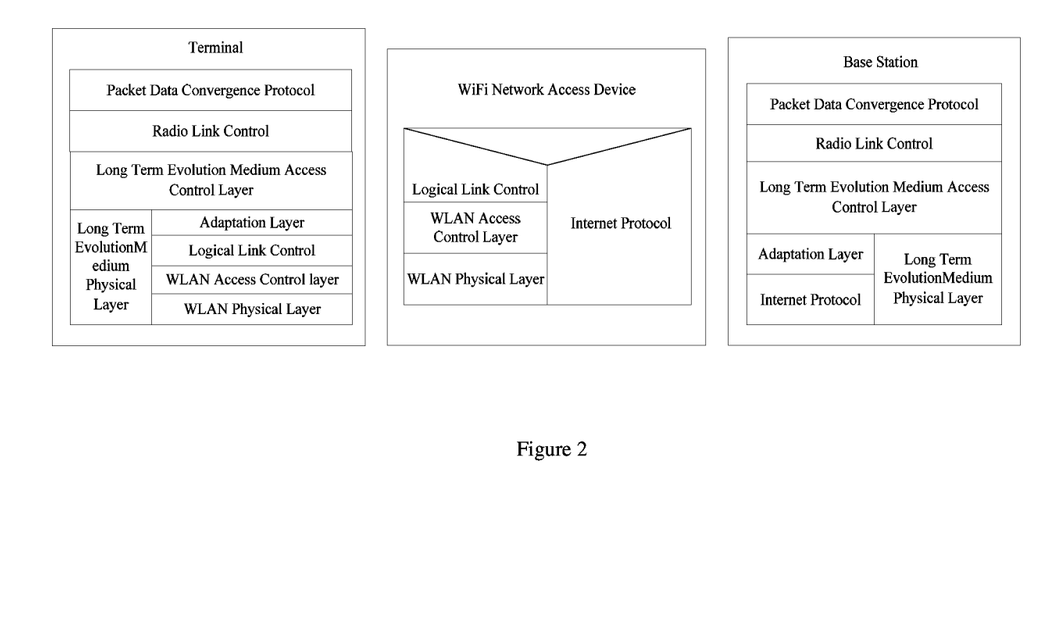
FIG. 2 is a schematic structure diagram of a protocol stack in user plane for architecture 1 in which a method for shunting data provided according to an embodiment of the disclosure may be applied.
Figure 3:
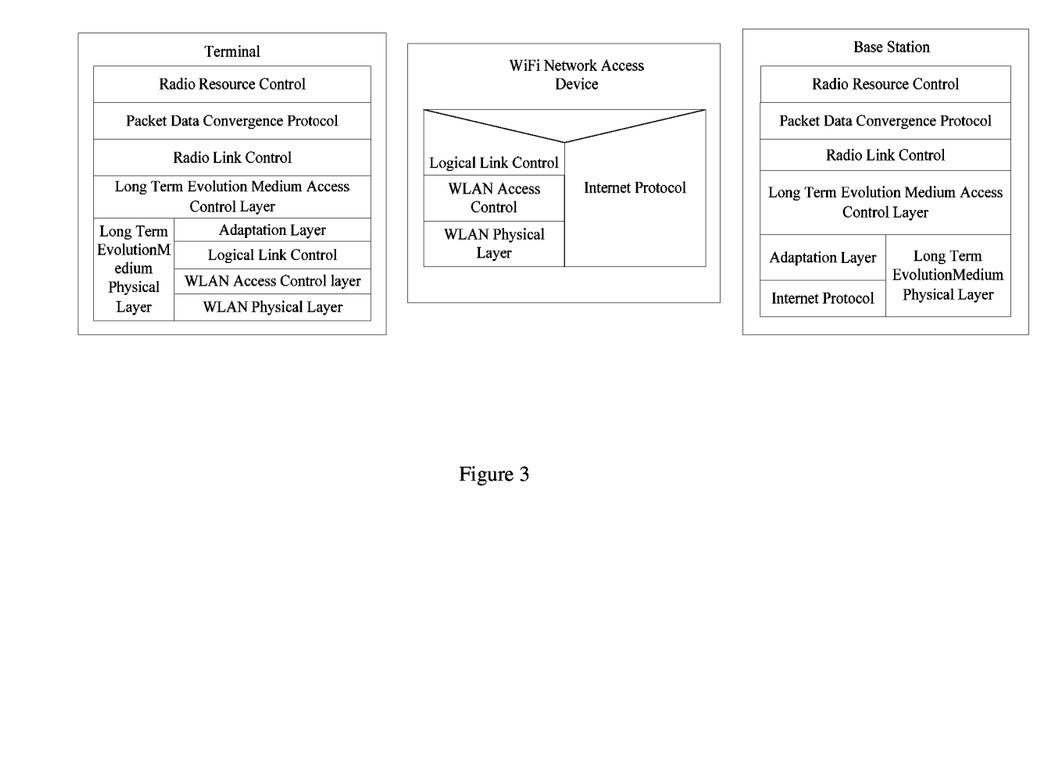
FIG. 3 is a schematic structure diagram of a protocol stack in control plane for architecture 1 shown in FIG. 2.
Figure 4:
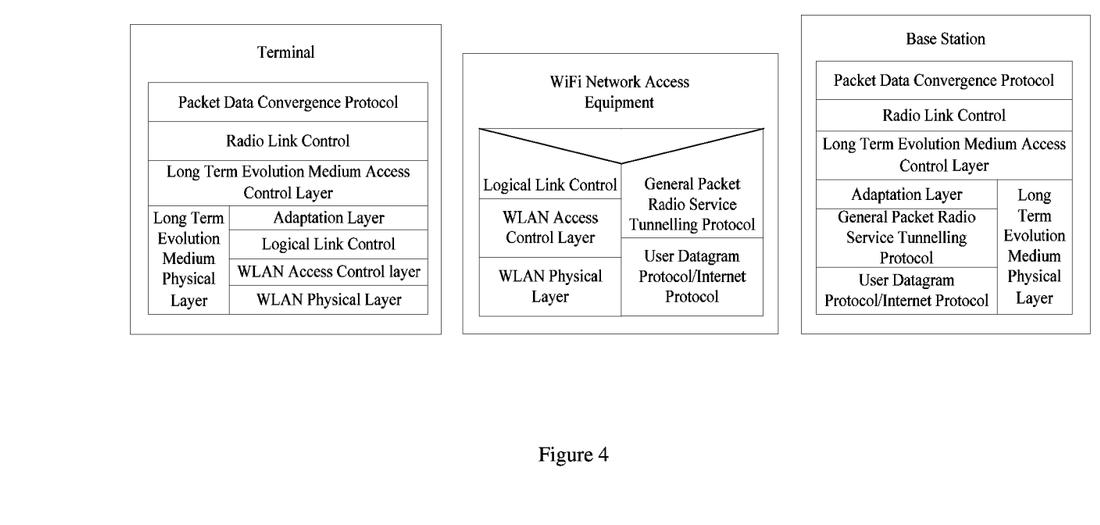
FIG. 4 is a schematic structure diagram of a protocol stack in user plane for architecture 2 in which a method for shunting data provided according to an embodiment of the disclosure may be applied.
Figure 5:
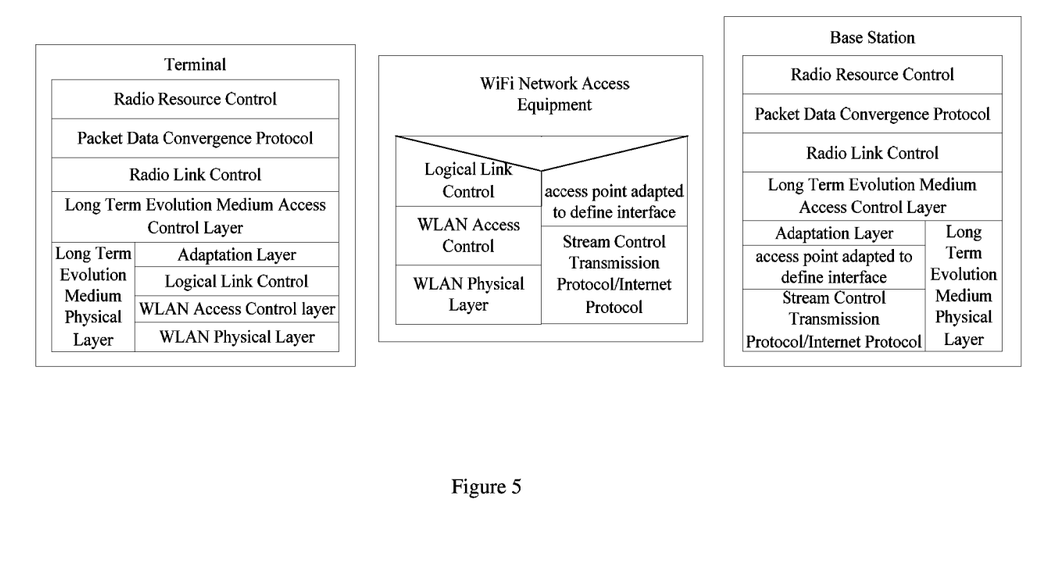
FIG. 5 is a schematic structure diagram of a protocol stack in control plane for architecture 2 shown in FIG. 4.

In a case that the base station and the network access device belong to two separate physical entities, an interface protocol stack between the base station and the network access device may include the protocol stack for the base station and protocol stack for the network access device in architecture 1 shown in FIG. 2 and FIG. 3, or may include the protocol stack for the base station and the protocol stack for the network access device in architecture 2 shown in FIG. 4 and FIG. 5.

The network access device is not limited in the embodiment of the disclosure, but may be set as needed, for example, the network access device may be WiFi network access device, and detailed description thereof is omitted herein. WiFi network access device is taken as example in the description of the following embodiment.

As shown in FIG. 2, a protocol stack in user plane for architecture 1 may include: a protocol stack for the WiFi network access device, a protocol stack for the base station and a protocol stack for the terminal.

From top to bottom, the protocol stack for the base station may include:

1. Packet Data Convergence Protocol (PDCP) layer, configured to encrypt and compress data, etc.
2. Radio Link Control (RLC) layer, configured to modify size of data packet, to determine transmission mode of data packet, etc.
3. Long Term Evolution Medium Access Control (LTE MAC) layer, configured to allocate resource, to reuse data packet, to inform the network of information such as size of the data packet to be transmitted, etc.
4. Long Term Evolution physical (LTE PHY) layer, configured to receive and send data packet, etc.

Alternatively, the layers below LTE MAC layer may include sequentially:

4'. Adaptation Layer (AL), configured to adapt services;
5'. Internet Protocol (IP) layer.

From top to bottom, the protocol stack for the WiFi network access device may include in order:

1. LLC; 2. WLAN MAC; 3. WLAN PHY;

Alternatively, the protocol stack for the WiFi network access device may include an IP layer;

From top to bottom, the protocol stack for the terminal may include:

1. PDCP layer; 2. RLC layer; 3. LTE MAC layer; 4. LTE PHY layer, etc.

Alternatively, the layers below LTE MAC layer may include sequentially:

4'. AL; 5'. Logical Link Control (LLC), configured to identify the network layer protocol and perform package according to the network layer protocol; 6'. WLAN MAC; 7'. WLAN PHY.

As shown in FIG. 3, a protocol stack in control plane for architecture 1 may include: a protocol stack for the WiFi network access device, a protocol stack for the base station and a protocol stack for the terminal.

The protocol stack for the WiFi network access device included in the protocol stack in control plane is the same as that included in the protocol stack in user plane.

The protocol stack for the base station included in the protocol stack in control plane is acquired by adding a Radio Resource Control (RRC) layer above the PDCP layer of the protocol stack for the base station included in the protocol stack in user plane, and the protocol stack for the terminal included in the protocol stack in control plane is acquired by adding a Radio Resource Control (RRC) layer above the PDCP layer of the protocol stack in user plane included in the protocol stack in user plane.

As shown in FIG. 4, a protocol stack in user plane in architecture 2 may include: a protocol stack for the WiFi network access device, a protocol stack for the base station and a protocol stack for the terminal.

The protocol stack for the terminal for the architecture 2 is the same as that for the architecture 2.

The protocol stack for the WiFi network access device and protocol stack for the base station of architecture 2 differ from that of architecture 2 in that:

Architecture 2 may include sequentially, at the place where the IP layer is located in architecture 1: General Packet Radio Service Tunneling Protocol (GTP) layer; User Datagram Protocol (UDP) layer or IP layer.

As shown in FIG. 5, a protocol stack in control plane for the architecture 2 may include: a protocol stack for the WiFi network access device, a protocol stack for the base station and a protocol stack for the terminal.

The protocol stack in control plane for the architecture 2 differs from that for architecture 1 as shown in FIG. 3 in that:

Architecture 2 may include sequentially, at the place where the IP layer of the Protocol stack for the WiFi network access device and the IP layer of the protocol stack for the base station are located in architecture 1: X2'-AP layer, configured to define an interface protocol between the base station and the shunting access device; Stream Control Transmission Protocol (SCTP) layer or IP layer.

Embodiment 1

Figure 6:
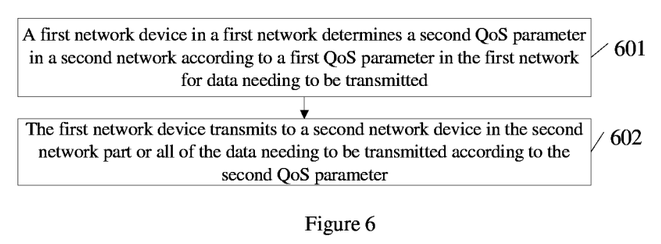
FIG. 6 is a flow chart of a method for shunting data provided according to an embodiment of the disclosure.

As shown in FIG. 6, the method provided according to this embodiment may include the following steps.

In Step 601, a first network device in a first network determines a second quality of service (QoS) parameter in a second network according to a first QoS parameter in the first network for data needing to be transmitted.

The data is shunted via a shunting network, i.e., part of the data is shunted to the second network for transmission, such that a load of a current cellular network may be reduced.

The QoS parameter for the data needing to be transmitted in the first network may be different from the QoS parameter for the transmission in the second network, therefore, before shunting data for a user equipment (UE), the first network device may determine the second QoS parameter in the second network according to the first QoS parameter in the first network for the data needing to be transmitted.

In Step 602, the first network device transmits to a second network device in the second network part or all of the data needing to be transmitted according to the second QoS parameter.

According to this technical solution, before the data is shunted, the first network device determines the second QoS parameter in the second network according to the first QoS parameter in the first network for the data needing to be transmitted; after the data is shunted, the first network device transmits to the second network device part or all of the data needing to be transmitted according to the second QoS parameter. After a process of shunting data, since the second QoS parameter is determined according to the first QoS parameter, it may be guaranteed that for the data transmission in the second network the QoS parameter required by the data needing to be transmitted may be met and the reliability of data transmission may be improved.

Embodiment 2

Figure 7:
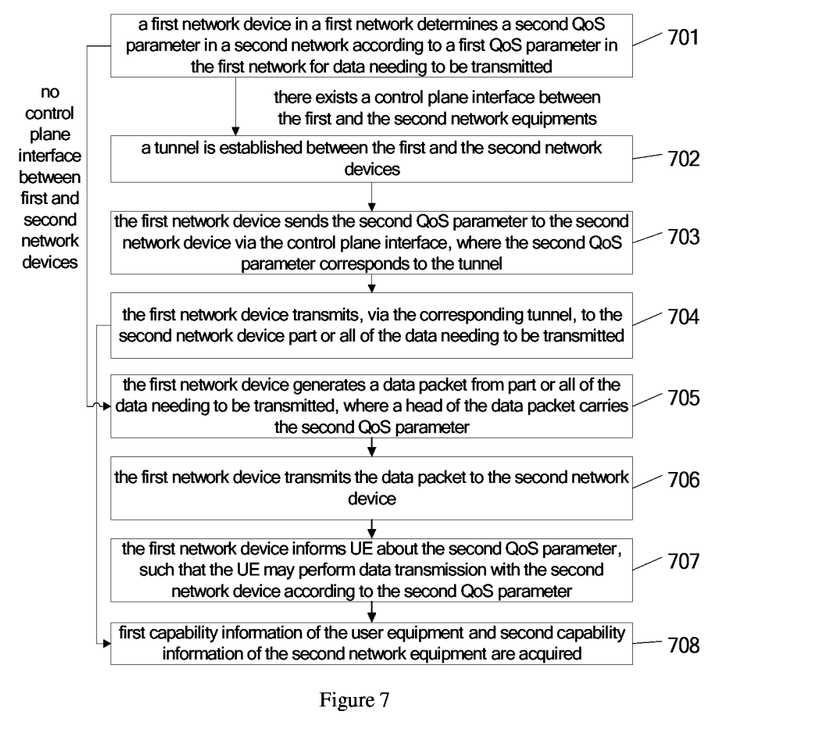
FIG. 7 is a flow chart of a method for shunting data provided according to another embodiment of the disclosure.

As an improvement, a method for shunting data is provided according to another embodiment. The method is executed by a first network device. As shown in FIG. 7, the method includes the following steps.

In Step 701, a first network device in a first network determines a second QoS parameter in a second network according to a first QoS parameter in the first network for data needing to be transmitted.

The data is shunted via a shunting network, i.e., part of the data is shunted to the second network for transmission, such that a load of a current cellular network may be reduced.

The QoS parameter for the data needing to be transmitted in the first network may be different from the QoS parameter for the transmission in the second network, therefore, before shunting data for a UE, the first network device may determine the second QoS parameter in the second network according to the first QoS parameter in the first network for the data needing to be transmitted.

Optionally, the first QoS parameter includes a first priority, and the second QoS parameter includes a second priority.

The scheme for determining the second QoS parameter is not limited in this embodiment, any scheme familiar to those skilled in the art may be adopted, and detailed description thereof is omitted herein.

The second QoS parameter is not limited in this embodiment, which may be set as needed, and detailed description thereof is omitted herein.

In a case that there exists a control plane interface between the first and the second network devices, Step 702 may be performed; in a case that there is not a control plane interface between the first and the second network devices, Step 705 may be performed.

In Step 702, a tunnel is established between the first and the second network devices in a case that there exists a control plane interface between the first and the second network devices.

The control plane interface may include a X2'-AP layer interface and a GTP layer interface, that is to say, this embodiment is based on architecture 2.

In this embodiment, tunneling is adopted for transmitting data. Tunneling is a way of transmitting data between networks via interconnection of network infrastructures. The data transmitted via a tunnel may be different data frames or data packets following different protocols. According to the tunnel protocol, namely, GTP, these data frames or packets following other protocols may be repackaged in a new packet head for transmission. The packaged data packet may be routed between the two ends of the tunnel via a public Internet. The data may be unpacked and then transmitted to a destination on arriving at the endpoint of the network. In the process of data transmission, a logical path through which the packaged data packet is transferred in the public Internet is called the tunnel. In a word, tunneling may include a whole process of data packaging, data transmission and data unpacking.

In configuring the tunnel, each tunnel corresponds to one second QoS parameter.

The correspondence between the second QoS parameter and the tunnel is not limited in this embodiment, it may be set as needed, and detail description thereof is omitted herein.

In Step 703, the first network device sends the second QoS parameter to the second network device via the control plane interface, where the second QoS parameter corresponds to the tunnel.

The first network device sends the second QoS parameter to the second network device via the control plane interface, such that the second network device may transmit in the second network the data needing to be transmitted, according to the second QoS parameter.

In Step 704, the first network device transmits, via the corresponding tunnel, to the second network device part or all of the data needing to be transmitted.

Since the second QoS parameter is determined according to the first QoS parameter, and the first network device transmits part or all of the data to the second network device via the corresponding tunnel according to the second QoS parameter, the QoS parameter required by the data transmitted in the second network may be guaranteed and the reliability of data transmission is improved.

As an implementation of this embodiment, in a case that the second QoS parameter for the data needing to be transmitted is 1, and the tunnel corresponding to the QoS parameter is tunnel 3, the data needing to be transmitted may be transmitted in tunnel 3.

Step 708 is performed.

In Step 705, the first network device generates a data packet from part or all of the data needing to be transmitted, where a head of the data packet carries the second QoS parameter.

In a case that there is not a control plane interface between the first and the second network devices, i.e., this step is based on architecture 1, since architecture 1 includes an IP layer instead of a control plane interface, and the IP layer is mainly configured to provide the data transmission service, the first network device may have the second QoS parameter carried in the data packet and sent to the second network device.

The first network device generates the data packet from part or all of the data needing to be transmitted, where the head of the data packet carries the second QoS parameter.

The contents included in the packet head are not limited in this embodiment and may be set as needed. For example, the packet head may include an IP packet head, and the priority information may be mapped into a field of Terms of Service (ToS) in the IP packet head.

In Step 706, the first network device transmits the data packet to the second network device.

The first network device transmits the data packet to the second network device so that the second network device may acquire the second QoS parameter and the data needing to be transmitted may be transmitted in the second network according to the second QoS parameter.

In Step 707, the first network device informs UE about the second QoS parameter, such that the UE may perform data transmission with the second network device according to the second QoS parameter.

In Step 708, first capability information of the UE is acquired, where the first capability information indicates that the UE supports data transmission based on a specified QoS; and second capability information of the second network device is acquired, where the second capability information indicates that the second network device supports data transmission based on the specified QoS.

In order to learn whether the UE and the second support the data transmission based on the specified QoS, the second network device acquires the first capability information of the UE and the second capability information.

Optionally, the UE may report or send the first capability information in the following way: the UE may report the shunting reference information of the UE to a base station via a RRC Connection Setup Complete (RRC) message in the process of establishing a RRC connection; or the UE may report the shunting reference information of the UE via a UE Capability information message in the process of querying the capability of the UE.

It should be noted that, the first capability information may be reported in ways other than those described above. For example, the first capability information may be reported via a RRC message with a newly added parameter, or via a newly defined RRC message or a Control Element (CE) for Medium Access Control (MAC). The names of the messages are not meant to limit the scope of the embodiment of the disclosure, i.e., the technical solution according to the embodiment of the disclosure may also be applicable in some systems even though the messages in the systems are differently named.

The way for the UE to transmit the first capability information and the system applicable for the method are not limited in this embodiment and may be set as needed, and detailed description thereof is omitted herein.

The second capability quality information may be acquired from network management configuration information, or from the information reported by the UE, or may be the information reported by the shunting device to the base station, and the disclosure is not limited thereto.

The UE may report in the following way. Before the shunting, the UE capable of accessing the shunting network may acquire the second capability information of one or more accessible shunting access devices by scanning and monitoring a Beacon frame of the one or more shunting access devices and then sends the second capability information of the one or more shunting access devices to the base station.

The way for the base station to receive the second capability information is not limited in this embodiment and may be set as needed, and detail description thereof is omitted herein.

According to this technical solution, before the data is shunted, the first network device determines the second QoS parameter in the second network according to the first QoS parameter in the first network for the data needing to be transmitted; after the data is shunted, the first network device transmits part or all of the data to the second network device according to the second QoS parameter. After the process of shunting data, since the second QoS parameter is determined according to the first QoS parameter, it may be guaranteed that for the data transmission in the second network the QoS parameter required by the data needing to be transmitted may be met and the reliability of data transmission may be improved.

Embodiment 3

Figure 8:
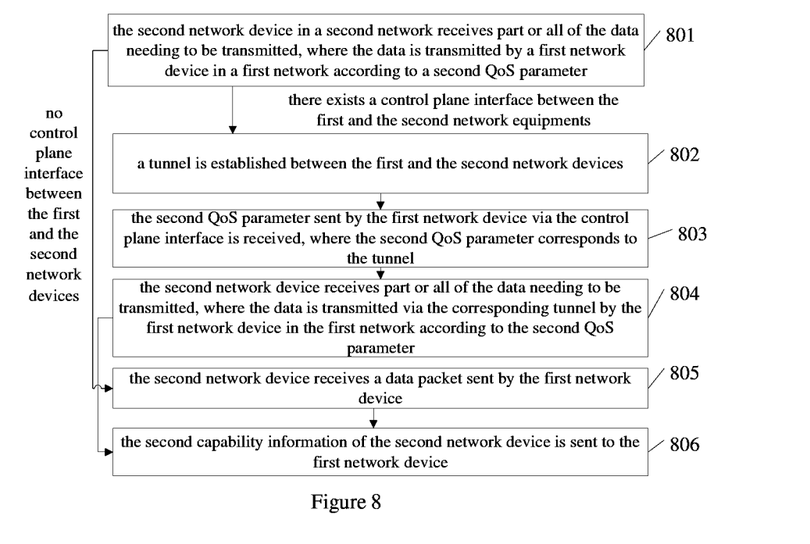
FIG. 8 is a flow chart of a method for shunting data executed by a second network device according to an embodiment of the disclosure.

Another method for shunting data is provided according to this embodiment. The method is executed by a second network device. As shown in FIG. 8, the method includes the following steps.

In Step 801, the second network device in a second network receives part or all of the data needing to be transmitted, where the data is transmitted by a first network device in a first network according to a second QoS parameter.

The second QoS parameter is determined by the first network device for the second network according to the first QoS parameter in the first network for the data needing to be transmitted.

Optionally, the first QoS parameter includes a first priority, and the second QoS parameter includes a second priority.

In a case that there exists a control plane interface between the first and the second network devices, Step 802 may be performed; in a case that there is not a control plane interface between the first and the second network devices, Step 805 may be performed.

In Step 802, a tunnel is established between the first and the second network devices.

In Step 803, the second QoS parameter sent by the first network device via the control plane interface is received, where the second QoS parameter corresponds to the tunnel.

In Step 804, the second network device receives part or all of the data needing to be transmitted, where the data is transmitted via the corresponding tunnel by the first network device in the first network according to the second QoS parameter.

Step 806 is performed.

In Step 805, the second network device receives a data packet sent by the first network device.

The data packet is generated by the first network device from part or all of the data needing to be transmitted, where a head of the data packet carries the second QoS parameter.

In Step 806, the second capability information of the second network device is sent to the first network device, where the second capability information indicates that the second network device supports a data transmission based on a specified QoS parameter.

Optionally, after shunting data, a UE finds that a Traffic Stream (TS) corresponding to the second QoS parameter for the data needing to be transmitted is not established, the TS may be established, where the priority of the TS is the same as the priority of the data.

As an implementation of this embodiment, in the process of transmitting the shunted data, in a case that the LTE MAC of the UE learns, via communicating with the second network device, that a new TS is required to be established, the UE may determine whether data has been transmitted with the second QoS parameter for the current data after accessing the second network. In a case that the UE has not transmitted data with the second QoS parameter, the LTE MAC of the UE may instruct the WLAN MAC to initiate the establishment of the TS.

The process of instructing the WLAN MAC by the LTE MAC of the UE to initiate the establishment of the TS may include: the LTE MAC of the UE instructs an AL, and the AL instructs an LLC, and the LLC instructs the WLAN MAC; or the LTE MAC of the UE instructs the AL, and the AL instructs the WLAN MAC; or the LTE MAC of the UE instructs the WLAN MAC directly. The instructing may be performed via a primitive between layers.

The way for the LET MAC of the UE to instruct the WLAN MAC to initiate the establishment of TS is not limited in this embodiment and may be set as needed, and detailed description thereof is omitted herein.

The way for the UE to determine whether it is required to establish a TS, and the primitive between layers, are familiar to those skilled in the art and detailed description thereof is omitted herein.

Optionally, after accessing the shunting network, for the purpose of more efficient and accurate transmission for the data needing to be transmitted, the transmitting terminal for transmitting the data needing to be transmitted, may package the data with the same second QoS parameter in the process of shunting the data and then transmit the packaged data in a format of Medium Access Control Protocol Data Unit (MAC PDU).

The sending terminal may include but not limited to base station or UE, etc.

According to this technical solution, the second network device transmits part or all of the data needing to be transmitted according to the received second QoS parameter, where the second QoS parameter is determined by the first network device according to the first QoS parameter. Hence, it may be guaranteed that for the transmission in the second network the QoS parameter required by the data needing to be transmitted may be met and the reliability of data transmission may be improved.

Embodiment 4

Figure 9:
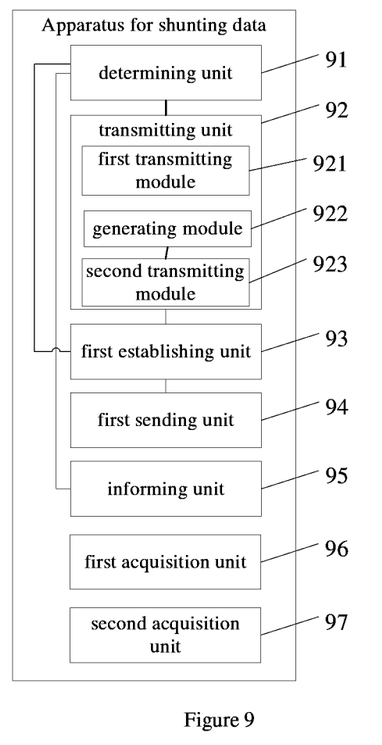
FIG. 9 is a schematic structure diagram of an apparatus for shunting data provided according to an embodiment of the disclosure.

An apparatus for shunting data is provided according to this embodiment. The apparatus may be applicable to a first network device in a first network. As shown in FIG. 9, the apparatus may include: a determining unit 91, a transmitting unit 92, a first establishing unit 93, a first sending unit 94, an informing unit 95, a first acquisition unit 96 and a second acquisition unit 97.

The transmitting unit 92 includes a first transmitting module 921, a generating module 922 and a second transmitting module 923.

The determining unit 91 is configured to be used by the first network device of the first network to determine a second QoS parameter in a second network according to a first QoS parameter in the first network for the data needing to be transmitted.

Optionally, the first QoS parameter includes a first priority, and the second QoS parameter includes a second priority.

The transmitting unit 92 is configured to be used by the first network device to transmit part or all of the data to a second network device in the second network according to the second QoS parameter.

The first transmitting module 921 is configured to be used by the first network device to transmit part or all of the data to the second network device via the tunnel according to the second QoS parameter.

The generating module 922 is configured to be used by the first network device to generate a data packet from part or all of the data needing to be transmitted, where a head of the data packet carries the second QoS parameter.

The second transmitting module 923 is configured to be used by the first network device to transmit the data packet to the second network device.

The first establishing unit 93 is configured to establish a tunnel between the first and the second network devices.

The first sending unit 94 is configured to be used by the first network device to send the second quality of service parameter to the second network device via the control plane interface, where the second QoS parameter corresponds to the tunnel.

The informing unit 95 is configured to be used by the first network device to inform a UE about the second quality of service parameter such that the UE may performs data transmission with the second network device according to the second QoS parameter.

The first acquisition unit 96 is configured to acquire first capability information of the UE, where the first capability information indicates that the UE supports data transmission based on a specified QoS.

The second acquisition unit 97 is configured to acquire second capability information of the second network device, where the second capability information indicates that the second network device supports data transmission based on a specified QoS.

According to this technical solution, before the data is shunted, the determining unit determines the second QoS parameter in the second network according to the first QoS parameter in the first network for the data needing to be transmitted; after the data is shunted, the transmitting unit transmits part or all of the data to the second network device according to the second QoS parameter. After a process of shunting data, since the second QoS parameter is determined according to the first QoS parameter, it may be guaranteed that for the data transmission in the second network the QoS parameter required by the data needing to be transmitted may be met and the reliability of data transmission may be improved.

Embodiment 5

Figure 10:
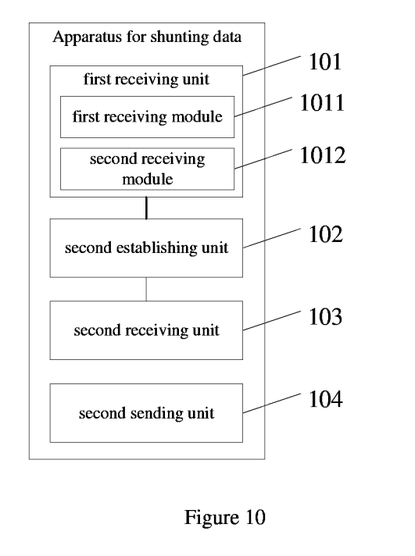
FIG. 10 is a schematic structure diagram of an apparatus for shunting data provided according to another embodiment of the disclosure.

Another apparatus for shunting data is provided according to this embodiment. The apparatus may be applicable to a second network device in a second network. As shown in FIG. 10, the apparatus may include: a first receiving unit 101, a second establishing unit 102, a second receiving unit 103 and a second sending unit 104.

The first receiving unit 101 includes a first receiving module 1011 and a second receiving module 1012.

The first receiving unit 101 is configured to be used by a second network device in a second network to receive par or all of the data needing to be transmitted, where the part or all of the data is transmitted by a first network device in a first network according to a second quality of service parameter, the second quality of service parameter is determined for the second network by the first network device according to a first quality of service parameter in the first network for the data needing to be transmitted.

Optionally, the first QoS parameter includes a first priority, and the second QoS parameter includes a second priority.

The first receiving module 1011 is configured to receive part or all of the data needing to be transmitted, where the part or all of the data is transmitted by the first network device of the first network via the tunnel according to the second quality of service parameter.

The second receiving module 1012 is configured to receive a data packet sent by the first network device, where the data packet is generated by the first network device according to part or all of the data needing to be transmitted, and a head of the data packet carries the second QoS parameter.

The second establishing unit 102 is configured to establish a tunnel between the first and the second network devices.

The second receiving unit 103 is configured to receive the second QoS parameter sent by the first network device via the control plane interface, where the second QoS parameter corresponds to the tunnel.

The second sending unit 104 is configured to send second capability information of the second network device to the first network device, where the second capability information indicates that the second network device supports data transmission based on a specified QoS.

According to this technical solution, the first receiving unit transmits, according to the received second QoS parameter, part or all of the data needing to be transmitted, where the second QoS parameter is determined by the first network device according to the first QoS parameter. Hence, it may be guaranteed that for the transmission in the second network the QoS parameter required by the data needing to be transmitted may be met and the reliability of data transmission may be improved.

By the foregoing description of the embodiments, those skilled in the art may understand clearly that the present disclosure may be implemented via software and necessary hardware platform, or via the hardware only; in most cases, the former is preferable. In view of this, all or part of the embodiments of the disclosure may be implemented by software product, where the software product may be stored in readable storage medium, such as ROM/RAM, disk or optical disk, and multiple instructions are included in the software product to enable a computer device (personal computer, server or network device) to implement the method provided according to each embodiment or certain part of the embodiment of the disclosure.

Specific embodiments of the disclosure are set forth above, but the scope of the disclosure is not limited thereto. The variation or replacement made by those skilled in the art within the scope of the disclosure is covered by the disclosure. Therefore, the scope of the disclosure is defined by the appended claims.

What is claimed is:

1. A method for shunting data between a first base station and a second base station, the method comprising:
   receiving, by the first base station, a first quality of a service parameter for the data from a network node;
   generating, by the first base station, a second quality of the service parameter from the first quality of the service parameter for the data, wherein the second quality of the service parameter is applied to the data to be transmitted by the second base station when the first base station is about to shunt at least part of the data to the second base station;
   sending, by the first base station, the second quality of the service parameter to the second base station via a control plane interface between the first and the second base stations;
   establishing, by the first base station, a tunnel with the second base station, wherein the second quality of the service parameter is associated with the tunnel;
   sending, by the first base station, a first part of the data to a user equipment according to the first quality of the service parameter; and
   transmitting, by the first base station, a second part of the data to the second base station via the tunnel so as to further forward the second part of the data to the user equipment.

2. The method for shunting data according to claim 1, wherein the first quality of the service parameter comprises a first priority, and the second quality of the service parameter comprises a second priority.

3. The method for shunting data according to claim 1, further comprising:
   informing, by the first base station, the user equipment about the second quality of the service parameter.

4. The method for shunting data according to claim 1, wherein transmitting the second part of the data to the second base station is accomplished according to the second quality of the service parameter.

5. A method for shunting data between a first base station and a second base station, the method comprising:
   receiving, by the second base station, a second quality of a service parameter from a first base station via a control plane interface between the first and second base stations, wherein the second quality of the service parameter is associated with a first quality of the service parameter;
   establishing a tunnel between the first and the second base stations for shunting at least part of the data to the second base station from the first base station, wherein the second quality of the service parameter is associated with the tunnel;
   receiving, by the second base station, a part of the data via the tunnel from the first base station; and transmitting, by the second base station, the part of the data to a user equipment according to the second quality of the service parameter.

6. The method for shunting data according to claim 5, wherein the first quality of the service parameter comprises a first priority, and the second quality of the service parameter comprises a second priority.

7. A second base station for shunting data from a first base station, the second base station comprising:
one or more processors; and
a memory, coupled to the one or more processors and storing program instructions, which when executed by the one or more processors, causes the second base station to be configured to:
receive a second quality of service parameter from a first base station via a control plane interface between the first and second base stations, wherein the second quality of the service parameter is associated with a first quality of the service parameter;
establish a tunnel between the first and the second base stations when the first base station wants to shunt at least part of the data to the second base station, wherein the second quality of the service parameter is associated with the tunnel;
receive a part of the data via the tunnel from the first base station; and
transmit the part of the data to a user equipment according to the second quality of the service parameter.

8. The second base station for shunting data according to claim 7, wherein the first quality of the service parameter comprises a first priority, and the second quality of the service parameter comprises a second priority.

9. The second base station for shunting data according to claim 7, wherein when the program instructions are executed by the one or more processors, the second base station is further configured to:
receive the part of the data from the first base station.

10. A first base station for shunting data from the first base station to a second base station, the first base station comprising:
one or more processors; and
a memory, coupled to the one or more processors and storing program instructions, which when executed by the one or more processors, cause the first base station to:
receive a first quality of service parameter for the data from a network node;
generate a second quality of the service parameter from the first quality of the service parameter for the data when the first base station wants to shunt at least part of the data to the second base station;
send the second quality of the service parameter to the second base station via a control plane interface between the first and second base stations;
establish a tunnel with the second base station, wherein the second quality of the service parameter is associated with the tunnel;
send a first part of the data to a user equipment according to the first quality of the service parameter; and
transmit a second part of the data to the second base station via the tunnel to further forward the second part of the data to the user equipment.

11. The first base station in the first cellular network for shunting data from the first cellular network according to claim 10, wherein the first quality of the service parameter comprises a first priority, and the second quality of the service parameter comprises a second priority.

12. The first base station in the first cellular network for shunting data from the first cellular network according to claim 10, wherein when the program instructions are executed by the one or more processors, the first base station is further configured to:
inform a user equipment about the second quality of the service parameter.

13. The first base station for shunting data from the first cellular network according to claim 10, wherein when the program instructions are executed by the one or more processors, the first base station is configured to:
transmit the second part of the data to the second base station according to the second quality of the service parameter.

14. An apparatus comprising a non-transitory computer-readable storage medium, wherein the non-transitory computer readable storage medium stores a program, and when the program is executed by one or more processors, the following operations are performed:
receiving a first quality of a service parameter for the data from a network node;
generating a second quality of the service parameter from the first quality of the service parameter for the data, wherein the second quality of the service parameter is applied to the data to be transmitted by a second base station when a first base station is about to shunt at least part of the data to the second base station;
sending the second quality of the service parameter to the second base station via a control plane interface between the first and the second base stations;
establishing a tunnel with the second base station, wherein the second quality of the service parameter is associated with the tunnel;
sending a first part of the data to a user equipment according to the first quality of the service parameter; and
transmitting a second part of the data to the second base station via the tunnel so as to forward the second part of the data to the user equipment.

15. The non-transitory computer-readable storage medium according to claim 14, wherein the first quality of the service parameter comprises a first priority, and the second quality of the service parameter comprises a second priority.

16. The non-transitory computer-readable storage medium according to claim 14, further comprising:
informing a user equipment about the second quality of the service parameter.

17. The non-transitory computer-readable storage medium according to claim 14, wherein transmitting the second part of the data to the second base station is accomplished according to the second quality of the service parameter.

18. An apparatus comprising a non-transitory computer-readable storage medium, wherein the non-transitory computer readable storage medium stores a program, and when the program is executed by one or more processors, the following operations are performed:
receiving a second quality of a service parameter from a first base station via a control plane interface between the first base station and a second base station, wherein the second quality of the service parameter is associated with a first quality of the service parameter;
establishing a tunnel between the first and the second base stations for shunting data between the first and the second base stations, wherein the second quality of the service parameter is associated with the tunnel;

receiving a part of the data via the tunnel from the first base station; and transmitting the part of the data to a user equipment according to the second quality of the service parameter.

19. The non-transitory computer-readable storage medium according to claim 18, wherein the first quality of the service parameter comprises a first priority, and the second quality of the service parameter comprises a second priority.

* * * * *